UNITED STATES PATENT OFFICE.

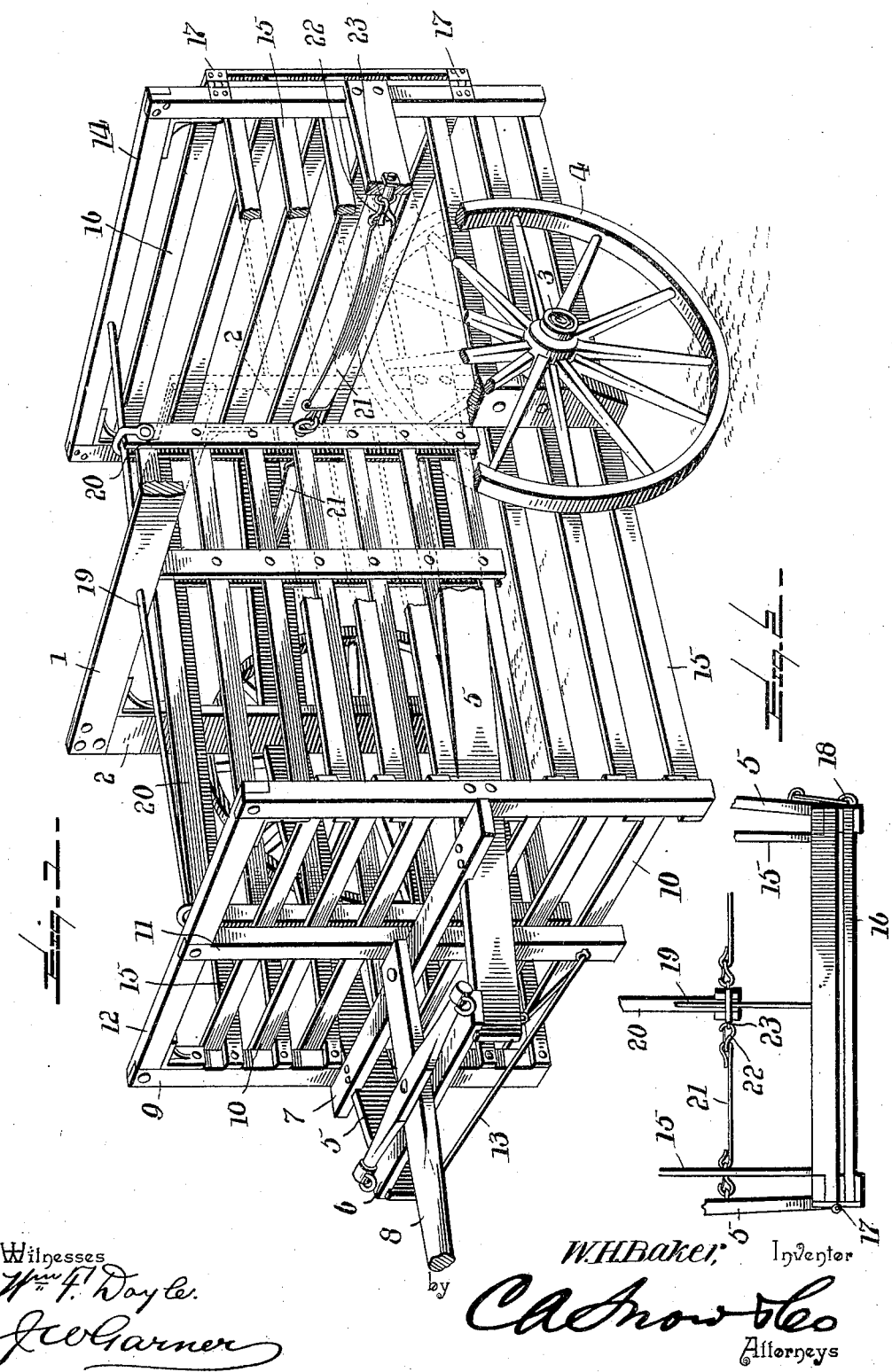

WILLIAM H. BAKER, OF TIFFIN, OHIO.

DRIVE-CAGE FOR LIVE STOCK.

SPECIFICATION forming part of Letters Patent No. 688,818, dated December 17, 1901.

Application filed July 5, 1901. Serial No. 67,187. (No model.)

*To all whom it may concern:*

Be it known that I, WILLIAM H. BAKER, a citizen of the United States, residing at Tiffin, in the county of Seneca and State of Ohio, have invented a new and useful Drive-Cage for Live Stock, of which the following is a specification.

My invention is an improved drive-cage for live stock, by means of which live stock, such as cattle, may be confined and controlled while being driven from one place to another; and it consists in the peculiar construction and combination of devices hereinafter fully set forth and claimed.

In the accompaning drawings, Figure 1 is a perspective view of a drive-cage constructed in accordance with my invention with a part of the near side thereof removed. Fig. 2 is a partial top plan view showing the rear portion of the cage.

In the embodiment of my invention here shown I provide a central arch frame 1, which is preferably of the form of an inverted U. To the standards 2 of the said central arch frames near the lower ends of the standards, are secured spindles 3, on which are mounted supporting-wheels 4. Side bars 5 are secured on the outer sides of the standards 2, and to the front ends of the said side bars is attached a cross-bar 6. A similar cross-bar 7 is attached to the said side bars at a suitable distance in rear of the cross-bar 6, and a draft pole or tongue 8 is secured on said cross-bars 6 7. A front arch frame 9, which is substantially of the same construction as the center arch frame 1, has its standards attached to the side bars 5 at a point immediately in rear of the cross-bar 7. The standards of the front arch frame are further connected together by horizontally-disposed bars 10, which form the front side of the cage. A vertical bar 11 has its upper end secured to the center of the cross-bar 12, which forms the top of the front arch frame 9, and said bar 11 is disposed immediately in rear of the bar 7 and has its lower end connected to the front ends of the side bars 5 and to the ends of the cross-bar 6 by braces 13.

Between the rear ends of the side bars 5 is secured a rear arch frame 14, which is similar to the central arch frame 1 in construction. The standards of the arch frames 1, 9, and 14 are connected together by bars 15, which are horizontally and longitudinally disposed, as shown, and form the sides of the cage. The rear arch frame 14 has a gate 16, hinged thereto at one side, as at 17, and suitable means, here shown as hooks 18, are provided for locking the said gate when closed. A brace-rod 19 connects the central portion of the arch frames. Under the said brace-rods is swung a partition-frame 20, which divides the cage into two stalls. The cage, as will be understood, may be made of any desired width and may be provided with any desired number of partitions in order to provide the cage with any desired number of stalls. The cage is bottomless, and cattle may be driven into the same through the rear end thereof when the gate is open, and the gate being then closed the cattle will then be confined within the cage, as will be understood. Across the rear end of each stall is a strap or other suitable device 21 for confining the cattle in the stalls and preventing them from backing out of the stalls. As here shown, the straps 21 are provided with suitable snap-hooks 22 to engage keepers 23, with which the partitions and the sides of the cage are provided. A team being harnessed to the cage, the same may be readily driven from one point to another, and the animals in the cage while being driven will be confined by the cage and kept completely under the control of the driver. In practice I attach a light two-wheel vehicle to the rear end of the cage and drive the team from the said vehicle.

It will be understood that suitable thills may be substituted for the draft-tongue.

Having thus described my invention, I claim—

1. A bottomless drive-cage mounted on wheels and having a draft element, said cage having arch frames connecting the sides thereof, a longitudinally-disposed brace-rod connecting said arch frames, a partition-frame, swung from the said brace-rod and dividing the said cage into stalls, and a gate at the rear end of said cage, substantially as described.

2. A bottomless drive-cage mounted on wheels and provided with a draft element, a gate at the rear end of the cage, and stalls in the front portion of the cage and opening at their rear ends into the rear portion of the cage, each of said stalls having at its rear end, means to prevent an animal in said stall from backing out thereof, said stalls preventing the animals therein from turning, substantially as described.

3. A bottomless drive-cage mounted on wheels and having a draft element, said cage having a gate at its rear end, a plurality of stalls within said cage, facing forwardly, and means at the rear end of the stalls to prevent animals in said stalls from backing out of them, substantially as described.

In testimony that I claim the foregoing as my own I have hereto affixed my signature in the presence of two witnesses.

WILLIAM H. BAKER.

Witnesses:
JAMES H. PLATT,
IRA CADWALLADER.